United States Patent [19]

Wolf

[11] 4,199,801

[45] Apr. 22, 1980

[54] COIL CAPACITOR

[76] Inventor: Franz-Josef Wolf, Sprudelallee 19, 6483 Bad Soden-Salmünster, Fed. Rep. of Germany

[21] Appl. No.: 898,085

[22] Filed: Apr. 20, 1978

Related U.S. Application Data

[63] Continuation-in-part of Ser. No. 797,552, May 16, 1977.

[30] Foreign Application Priority Data

Apr. 20, 1977 [DE] Fed. Rep. of Germany ....... 2717540
Apr. 23, 1977 [DE] Fed. Rep. of Germany ....... 2718228

[51] Int. Cl.² .............................................. H01G 1/02
[52] U.S. Cl. .................................... 361/272; 361/274; 361/275; 361/307
[58] Field of Search ............... 361/272, 275, 274, 307; 174/52 S

[56] References Cited

U.S. PATENT DOCUMENTS

| 934,714 | 9/1909 | Denieport | 361/307 X |
|---|---|---|---|
| 1,898,789 | 2/1933 | Ringwald | 361/307 |
| 2,289,249 | 7/1942 | Deibel | 174/52 S X |
| 2,672,498 | 3/1954 | Temple | 174/52 S X |
| 3,244,952 | 4/1966 | Graf | 361/275 |
| 3,551,864 | 12/1970 | Sweeney | 336/83 |

FOREIGN PATENT DOCUMENTS

616214  1/1949  United Kingdom ..................... 361/310

*Primary Examiner*—E. A. Goldberg
*Attorney, Agent, or Firm*—Fulwider, Patton, Rieber, Lee & Utecht

[57] ABSTRACT

A coil capacitor with a capacitor coil placed in a cup-like housing. Capacitor foils are spirally wound up on a metal core which is a unitary one piece structure extending from a metal closure lid. The inner of the foils is electrically connected to the closure lid while the outer foil is electrically connected to a metallic cup-like housing, thus avoiding the necessity of electrical lead throughs. The edge of the closure lid is surrounded by a resilient seal which rests upon a support corrugation rolled into the housing wall and is captured by the rolled-in upper edge of the housing. A contact corrugation formed in the housing wall effectuates electrical connection with the outer foil.

6 Claims, 1 Drawing Figure

COIL CAPACITOR

BACKGROUND OF THE INVENTION

This is a continuation-in-part of U.S. application Ser. No. 797,552, filed May 16, 1977.

The invention of this prior application is a capacitor coil-core made in one piece with a housing plate lid. It is possible for the lid and the coil-core to be of metal material and to be elastically joined together. The capacitor coil wound on the coil-core is electrically joined at one end with the inside face of the lid. On winding the coil, more particularly in the case of small capacitors, the making of the electrical end contact needed is not readily possible in all cases.

SUMMARY OF THE INVENTION

One purpose of the present invention is the making of a coil capacitor of the given sort with a coil-core and lid made in one piece and in which there is a better electrical contact between the coil and the lid.

The capacitor coil is comprised of a pair of electrode foils separated by a dielectric, and spirally wound-up together in a cylindrical configuration.

The electrical connection between, in particular, the inner electrode foil of the coil and the coil-core is able to be made simply by tight winding of the coil on the coil-core, by a gripping effect, by soldering or in any other way as needed.

The capacitor coil electrically joined with its core and the lid are then put, in the best form of the invention, in connection with a cup-shaped capacitor housing made, more particularly, of aluminum. The outside edge of the lid is in this form of the invention covered with a casing of electrically insulating and sealing material which is for electrical insulation of the lid from the cup-like housing and for gas- and liquid-tight sealing between them. In particular, that is to say in the best form of the invention, the edge part, having the insulating casing round it, of the lid comes up against a stretch corrugation keeping it in place and which is formed in the cylindrical part of the cup-like housing. The clearance inside diameter of the stretch corrugation, used for support of the lid, is in particular somewhat greater than the outside diameter of the coil, so that on putting the capacitor together the coil can readily be slipped in through the support stretch corrugation into the housing.

After putting in the capacitor coil, in the best form of the invention, a second stretch corrugation is rolled in, which is forced on to the outer face of the coil so as to make an electrical connection between the outside electrode foil of the coil and the cup-like housing.

In this form of the capacitor the contacting corrugation is so made than on overpressure in the capacitor housing it is opened up or pulled open before the support corrugation. When this takes place the contact corrugation is furthermore radially stretched so that one of the two electrical contacts of the capacitor is broken. This mechanism makes for a certain safeguard against overloading. Because the capacitor coil is fixedly kept in place on the core on the lid it is possible to make certain that the broken electrical contact is not made again because of shaking or because the capacitor is so positioned that there is a tendency for the contact to be made again.

A further good point with this development of the coil capacitor is that the whole of it is put together without needing a single wiring or soldering operation.

In a further development of the invention the electrically insulating, rubber-elastic casing of the outside edge of the lid is made by direct molding around the lid with a rubber blend, which is then vulcanized. In particular the lid has a higher middle part, which, as seen from the outer side, opposite to the molded coil-core, of the capacitor is flat and which is in the same plane as the outwardly turned ring face of the casing and comes up to this face in line with it. This makes not only for an orderly and smooth outside fact of the capacitor housing, but for a more simple and, more particularly, accurate centering of the lid in an injection mold for molding of material around the lid.

The invention will now be made clear by an account in connection with the drawing having one figure.

DESCRIPTION OF AN EMBODIMENT OF THE INVENTION

Figure 1:
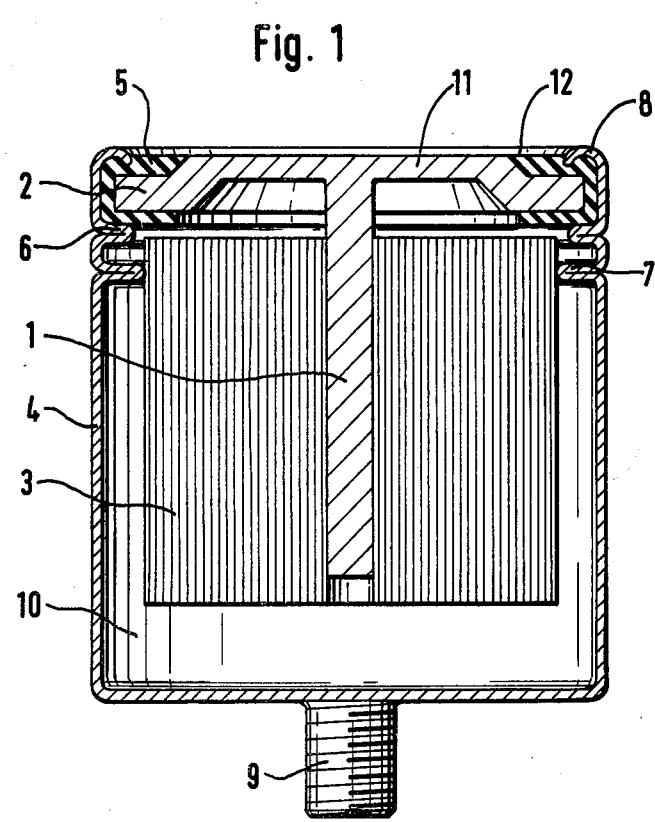
FIG. 1 is a view of the invention in axial section.

The capacitor, which is of the housing sort, has, as its main parts, the coil-core 1, the lid 2 made in one piece with the core 1, the coil 3 and the cup-like housing 4. The coil-core 1 and the lid 2 are made of aluminum. The coil is made up in the normal way of two electrode foils or electrode layers with insulation foils inbetween them.

The coil band is so wound tightly on the coil-core that the radially inside foil of the two electrode foils is joined electrically to the coil-core 1, when the coil is complete. The outside foil of the two electrode foils is free on the outside cylindrical face of the coil 3.

On its outside edge the lid 2 supporting the coil is covered with a rubber-elastic sealing compound 5. This casing 5 goes round the edge part on the topside, the underside and the radially outer face. The rubber-elastic material, of which the casing 5 is made, is electrically insulating. The lid 2 has a flat higher middle part 11 in the same plane as the outside ring face 12 of the casing 5. The higher part 11 has the casing 5 going round and in line with it.

For putting the capacitor together the unit made up of the coil-core 1, the lid 2, the coil 3 and the sealing casing 5, is put into the cup-like housing, open at one end 4 of aluminum and slipped down into its position. In the cylindrical part of the cup-like housing 4 a support corrugation 6 is formed, whose free inside diameter is greater than the outside diameter coil 3 so that the latter is able to be put freely through the corrugation into the housing 4. The outside diameter of the lid 2 and of the radial part of the casing 5 is greater than the clearance diameter of the support corrugation 6 so that the lid comes up against the edge of the corrugation on putting in the cup-like housing. After this contact corrugation 7 is so rolled under the support corrugation 6 in the cylindrical part of the aluminum housing 4 that an electrical connection comes into being between the housing 4 and the outside electrode foil on the cylindrical face of the coil. Then in the normal way the top housing edge edge 8 is so rolled in that the inside of the housing 4 is shut off so as to be gas- and liquid-tight. This sealing casing 5 makes for electrical insulation of the coil-core 1 and the lid 2 from the cup-like housing.

The electrical connection of the housing is got for example by a screw 9 used for putting the capacitor together or in any other way readily at hand, as for example a soldered contact. The electrical contact with the lid 2 is effected by a spring contact, by soldering or in any other readily used way. In particular contact parts formed in one piece on the lid 2 (not seen in the Figure) are used, for example in the form of soldering eyes, screw-threaded parts or plug-in mounts.

On overloading of the capacitor an overpressure is produced in the inside 10 of the housing 4. On acting on the lid this pressure makes for an axial stretching of the housing. That is to say firstly the deeper contact corrugation 4 and then, later, the support corrugation are opened up. This order of opening up is able to be made more certain by a stronger structure of the support corrugation in addition. This axial opening up of corrugation 7 which first takes place on overloading and overpressure in the inside 10 of the capacitor makes for a radial opening of the corrugation 7 at the same time as well. The outcome is however at the same time that the electrical contact is broken. Because however the coil is kept supported fixedly on the lid 2, the making of the broken contact again between the coil outside face and the contact corrugation 7 of the housing 4 is not possible even on shaking or such a positioning of the capacitor having the tendency to make for such new contacting. A capacitor made on the lines made clear is at the same time automatically safeguarded against overloading.

The important reason why the capacitor is better than other designs is that the last step in putting it together is only two cold forming operations on the cup-like housing 4 without even one soldering operation. In addition the capacitor is put together without the use of any wired connection or of connection lugs.

I claim:

1. A capacitor comprising:
   (a) a cup-like metal housing having a rolled in upper edge and a support corrugation in the wall thereof;
   (b) a metal closure lid for said housing formed as a unitary one piece structure with a metal core serving as a winding mandrel;
   (c) a capacitive element of the type employing spirally wound up electrode foils, the innermost of said electrode foils being wound in electrical contact with said metal core, and the outermost of said electrode foils being in electrical contact with said housing;
   (d) an electrically insulating resilient seal covering the peripheral edge part of said lid on its topside, underside, and radially outer face, and providing a gas and liquid tight sealing interface between said lid and said rolled in upper edge if said housing while resting with its undersurface on said support corrugation.

2. A capacitor according to claim 1 wherein said seal is made of a rubber composition which has been molded around the outer lid and then vulcanized.

3. A capacitor according to claim 2 wherein said lid, as seen from the outerside of said capacitor, has a flat convex raised central portion, which portion is flush with an upper outer ring-shaped surface of said seal on the topside peripheral edge of said lid.

4. A capacitor comprising:
   (a) a cup-like metal housing having a rolled in upper edge, a support corrugation formed in the wall of said housing, and a contact corrugation rolled in the wall of said housing having a free inner diameter smaller than the free inner diameter of said support corrugation.
   (b) a metal closure lid for said housing formed as a unitary one piece structure with a metal core serving as a winding mandrel;
   (c) a capacitive element of the type employing wound up electrode foils, the innermost of said electrical foils being in electrical contact with said metal core and the outermost of said electrical foils being in electrical contact with said contact corrugation;
   (d) an electrically insulating resilient seal covering the peripheral edge part of said lid on its topside, underside and radially outer face and providing a gas and liquid tight sealing interface between said lid and said rolled in upper edge of said housing and resting with its underside edge on said support corrugation formed on the wall of said housing.

5. A capacitor according to claim 4 wherein said seal is made of a rubber composition which has been molded around the outer edge of said lid and then vulcanized.

6. A capacitor according to claim 5 wherein the lid as seen from the outer side of said capacitor has a flat raised central portion which is flush with an upper, outer ring-shaped surface of said seal on the topside peripheral edge of said lid.

* * * * *